United States Patent

Schleyer

[15] 3,673,268
[45] June 27, 1972

[54] HEXACYCLOTETRACDECANES

[72] Inventor: Paul Von R. Schleyer, Princeton, N.J.

[73] Assignee: Union Carbide Corporation

[22] Filed: Dec. 15, 1970

[21] Appl. No.: 98,438

Related U.S. Application Data

[63] Continuation of Ser. No. 882,787, Dec. 22, 1969, abandoned, which is a continuation of Ser. No. 809,454, Feb. 27, 1969, abandoned, which is a continuation of Ser. No. 409,545, Nov. 6, 1964, abandoned.

[52] U.S. Cl. ........................................................ 260/666 PY
[51] Int. Cl. ................................................................ C07c 13/28
[58] Field of Search ............................................ 260/666 PY

[56] References Cited

UNITED STATES PATENTS 3,113,424   12/1963   Wineman ........................ 260/666 PY
3,250,818   5/1966    Connell .......................... 260/666 PY

*Primary Examiner*—Delbert E. Gantz
*Assistant Examiner*—Veronica O'Keefe
*Attorney*—Paul A. Rose, Gerald R. O'Brien, Jr., Harrie M. Humphreys and William R. Moran

[57] ABSTRACT

A class of hexacyclotetradecanes which are useful in the preparation of epoxy resins, paints, and varnishes, is prepared by the catalytic isomerization at temperatures of from about 25° to about 250° C. of polycyclic saturated hydrocarbons containing at least 14 carbon atoms and five fused ring systems of from three to eight carbon atoms per ring.

7 Claims, No Drawings

HEXACYCLOTETRACDECANES

This application is a continuation of Ser. No. 882,787 Filed Dec. 22, 1969 which was a continuation of Ser. No. 809,454 filed on Feb. 27, 1969 which was a continuation of Ser. No. 409,545 filed on Nov. 6, 1964, all of which are abandoned.

"The Chemical Abstract nomenclature for the compositions of this invention is "decahydro-3, 5, 1, 7-[1.2.3.4] butane tetraylnaphthalenes". However, for sake of brevity the compositions are referred to herein as "diamantanes" or "hexacyclotetradecanes".

This invention relates to novel polycyclic compositions and to a process for their preparation. In one aspect, this invention relates to novel hexacyclotetradecanes and derivatives thereof. In a further aspect, this invention is directed to novel compositions of matter which are a useful class of compounds having significant and outstanding properties in various fields of application.

The novel polycyclic compositions of this invention can be conveniently represented by the following formula:

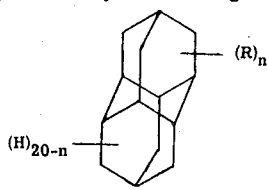

wherein R represents an organic or inorganic radical, as hereinafter defined, and $n$ has a value of from 0 to 8. Preferred compounds represented by the aforesaid formula are those wherein R represents an organic radical and $n$ has a value of from 0 to 5, and more preferably, from 0 to 2.

Illustrative novel polycyclic compositions which can be prepared in accordance with the teachings of the invention include hexacyclotetradecane, i.e., wherein $n$ of the aforementioned formula is zero, methylhexacyclotetradecane, dimethylhexacyclotetradecane, propylhexacyclotetradecane, bromohexacyclotetra-decane, aminohexacyclotetradecane, carboxyhexacyclotetradecane, and the like.

The novel polycyclic compositions of this invention are useful in a variety of applications as hereinafter indicated under the respective embodiments. Many of the novel compositions due to the presence of one or more functional groups react readily with other compounds such as alcohols, amines, acids and the like, to form new and valuable products. Moreover, due to the similarity in physical and chemical properties of the hexacyclotetradecanes to the tricyclo[3.3.1.1.$^{3,7}$]decanes, as hereinafter indicated, certain of the compounds are particularly attractive as pharmaceutical intermediates.

It is therefore an object of this invention to provide a series of novel polycyclic compositions and a process for their preparation. A further object of this invention is to provide novel hexacyclotetradecanes and derivatives thereof. Another object of the invention is to provide novel compositions which are useful in the preparation of physiologically active compounds. A still further object is to provide derivatives of hexacyclotetradecanes which are useful in a wide variety of applications. Another object of the invention is to provide a process for the preparation of the aforementioned novel compositions. These and other objects will readily become apparent to those skilled in the art in the light of the teachings herein set forth.

In its broad aspect, the present invention is directed to novel hexacyclotetradecanes of the aforementoned formula and to process for their preparation. The novel polycyclic nucleus as depicted by the aforementioned formula is composed solely of carbon and hydrogen and is a unique, essentially strain-free cube consisting of six-membered rings on each side. The unique structure of hexacyclotetradecane (I) is reflected in its unusual physical and chemical properties which, in many respects, are markedly similar to adamantane, tricyclo[3.3.1.1 $^{3,7}$]-decane (II):

Hexacyclotetradecane, however, contains four additional carbon atoms one of which is a bridgehead carbon atom (at number 12 position) attached to the adamantane nucleus through three methylene groups (at position numbers 11, 13 and 14) to form three additional bridgeheads (at position numbers 2, 4 and 9).

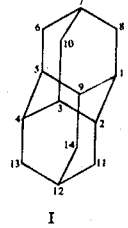 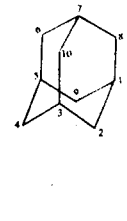

I  II

It has been observed that adamantane possesses a unique rigid but essentially strain-free ring system composed of three fused chain cyclohexane rings. X-Ray and electron diffraction studies have indicated that adamantane crystallizes in a face-centered cubic lattice of space group I $^{2}_{d}\overline{F43}m$, with $a=9.426 \pm 0.008$A., and four molecules per unit cell. All carbon-carbon bond lengths are $1.54 \pm 0.01$A. and all C—C—C angles $109.5°$a $\pm 1.5°$. In view of this unusual structure which is common to both compositions, the physical properties of both adamantane and hexacyclotetradecane are outstanding for an organic compound. For instance, adamantane is one of the highest melting hydrocarbons known, 269° C. yet it sublimes readily even at atmospheric pressure and room temperature. Similarly, hexacyclotetradecane has a relatively high melting point of 236°–237° C.

It has also been observed that the infrared spectra of both hexacyclotetradecane and adamantane are quite simple. The spectrum of adamantane itself is nearly featureless, consisting of only nine significant lines in the 2 to 14 $\mu$ region. The nuclear magnetic resonance spectra of both hexacyclotetradecane adamantane are also quite similar. Adamantane itself appears as a sharp doublet at 8.22 tau, while the hexacyclotetradecane appears as a singlet at 8.32 tau.

The mass spectra of the two hydrocarbons are also quite unusual. Unlike the behavior of most saturated hydrocarbons of moderate molecular weight, the parent peak ($m/e = 136$) of adamantane is the most intense in the entire spectrum, reflecting the inherent architectural rigidity of the interlocking ring systems. Similarly, the peak ($m/e = 188$) of hexacyclotetradecane, is also consistent with its symmetrical, fused structure.

Adamantane is characterized by four bridgehead positions which resemble in an expanded form, the four valences of carbon, extending tetrahedrally from a central point. In contrast hexacyclotetradecane has eight bridgeheads, each of which is separated by a methylene group.

It should be noted that in a 1-substituted hexacyclotetradecane, the seven remaining bridgehead positions are equivalent with respect to the group already present. Moreover, the introduction of a second bridgehead substituent can lead to only one product. Similarly, in a disubstituted derivative, the six remaining bridgehead positions are equivalent, and only one product can result from the further introduction of a substituent to a bridgehead position. Hence, the mono-substituted hexacyclotetradecanes are not designated by any particular bridgehead position.

In one embodiment, the present invention is directed to the unsubstituted polycyclic hydrocarbon, hereinafter referred to as hexacyclotetradecane, and the alkyl-substituted hexacyclotetradecanes. These novel compositions can be represented by the formula:

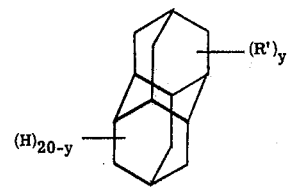

wherein R' represent hydrogen or alkyl and $y$ has a value of from 1 to 8. Preferred compositions within the aforementioned formula are those wherein $y$ has a value of from 1 to 5 and more preferably from 1 to 2 and the sum total of carbon atoms in the R' groups is no greater than 10.

Illustrative compositions within this embodiment of the invention include, among others, hexacyclotetradecane, methylhexacyclotetradecane, dimethylhexacyclotetradecane, trimethylhexacyclodecane, tetramethylhexacyclotetradecane, pentamethylhexacyclotetradecane, hexamethylhexacyclotetradecane, octamethylhexacyclotetradecane, ethylhexacyclotetradecane, diethylhexacyclotetradecane, triethylhexacyclotetradecane, tetraethylhexacyclotetradecane, pentaethylhexacyclotetradecane, propylhexacyclotetradecane, dipropylhexacyclotetradecane, tripropolyhexacyclotetradecane, isopropylhexacyclotetradecane, n-butylhexacyclotetradecane, sec-butylhexacyclotetradecane, tertiary-butylhexacyclotetradecane, di-n-butylhexacyclotetradecane, di-sec-butylhexacyclotetradecane, di-tertiary-butylhexacyclotetradecane, n-pentylhexacyclotetradecane, di-n-pentylhexacyclotetradecane, hexylhexacyclotetradecane, heptylhexacyclotetradecane, octylhexacyclotetradecane, nonylhexacyclotetradecane, decylhexacyclotetradecane, methyl, ethylhexacyclotetradecane, dimethyl, ethylhexacyclotetradecane, dimethyl, diethylhexacyclotetradecane, ethyl, propylhexacyclotetradecane, ethyl, dipropylhexacyclotetradecane, methyl, pentylhexacyclotetradecane, dimethyl, pentylhexacyclotetradecane, propyl, and the like.

The novel hexacyclotetradecane and alkyl-substituted derivatives of this embodiment of the present invention can be prepared by the isomerization of a variety of known polycyclic hydrocarbons under conditions hereinafter described. It has been observed that any saturated alicyclic hydrocarbon containing at least 14 carbon atoms and five ring systems of from three to eight atoms per ring, can be employed in the preparation of these novel compositions. Those polycyclic hydrocarbons of 14 carbon atoms isomerize under the conditions of the invention to the unsubstituted hexacyclotetradecane of the formula indicated. Hydrocarbons containing greater than 14 carbon atoms, for example up to 24, isomerize to alkyl-substituted hexacyclotetradecanes. Do-decahydro-1,4:5,8-dimethanobiphenylene which contains five fused rings and 14 carbon atoms undergoes isomerization to give hexacyclotetradecane (I):

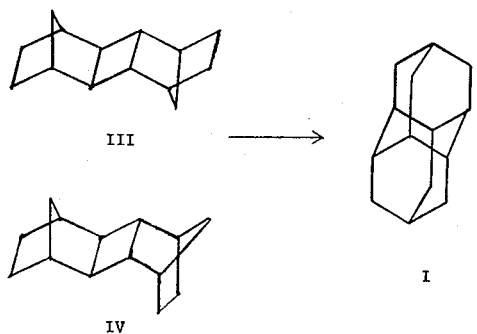

Either the exo-trans-exo isomer (III) or the exo-trans-endo isomer (IV) of the 1,4:5,8-dimethanobiphenylene can be employed as the starting material, as well as mixtures thereof. Illustrative of a polycyclic hydrocarbon containing greater than 14 carbon atoms is 1,4:5,8-dimethanofluorene which contains five fused rings and 15 carbon atoms. This compound isomerizes to a methyl-substituted hexacyclotetradecane (V) in accordance with the equation:

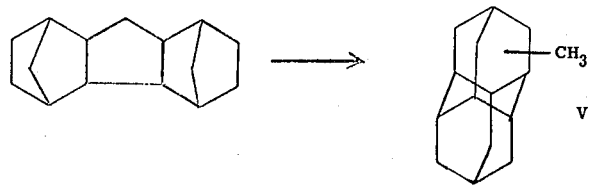

Polycyclic hydrocarbons containing five fused rings and 16 carbon atoms undergo isomerization to the dimethyl- or ethyl-substituted hexacyclotetradecane. For example, 1,4:5,8-dimethanoanthracene isomerizes to the ethyl- and dimethyl-substituted derivatives of hexacyclotetradecane, Similarly, 1,4:9,10-dimethanoanthracene, and 2,4a:6,8a-dimethanoanthracene isomerize to provide the same alkyl-substituted derivatives. Hydrocarbons of five rings and 17 carbon atom such as 9,12-cyclogonane, when isomerized provide the propyl-, methyl,ethyl- or trimethyl-substituted derivatives.

As the number of carbon atoms in the polycyclic hydrocarbon starting material increases, the greater the number and variety of alkyl-substituted derivatives can be formed. Thus, hydrocarbons containing five rings and 18 carbon atoms such as 16aH-cyclopropa[16,17]cyclopenta[a]phenanthrene, cyclobuta[1,2-a:3,4-a']diindene, 1,4:7,10-dimethanodibenzo[a,e]cyclooctene, and the like, can isomerize to provide butyl-, methyl, propyl, diethyl-, or tetramethyl-substituted hexacyclotetradecanes. Dispiro[2H-indene-2,1'-cyclopropane-2',2''-[2H]indene], which contains 19 carbon atoms and five ring systems, also isomerizes to the alkyl-substituted hexacyclotetradecane. Indeneo[2.1-b]-fluorene, indeno[5,4-a]fluorene, and similar 20 carbon atom polycyclic hydrocarbons containing five ring systems likewise undergo isomerization. Dibenzo[e,e']cyclobuta[1,2-a; 3,4-a]-dicyclooctene which contains 24 carbon atoms and five ring systems, two of which contain eight carbon atoms, also undergoes isomerization to provide a variety of alkyl-substituted hexacyclotetradecanes. Thus, in each instance, if the polycyclic hydrocarbon starting material is characterized by at least 14 carbon atoms and five ring systems, the basis hexacyclotetradecane structure will be formed and any carbon atoms above 14 in number will occur as alkyl substituents. Moreover, hydrocarbon starting materials containing more than 14 carbon atoms, need not have all the atoms present as part of ring systems as long as the five ring systems are present. For example, methyl-substituted 1,4:5,8-dimethanobiphenylenes are useful in the preparation of the compositions of the invention. The aforementioned saturated, polycyclic hydrocarbon starting materials which contain at least 14 carbon atoms and five ring systems can themselves be conveniently prepared from readily available materials. For example, 1,4:5,8-dimethanobiphenylene can be prepared by the photo dimerization of norbornene in an inert organic solvent. In many instances, the saturated polycyclic hydrocarbon can be synthesized by hydrogenating the corresponding known unsaturated cyclic compound. For instance, the 1,4:5,8-dimethanobiphenylene can be prepared by hydrogenating the polycyclic diene prepared from 2,5-norbornadiene in accordance with the teachings of Belgian Pat. No. 626,407:

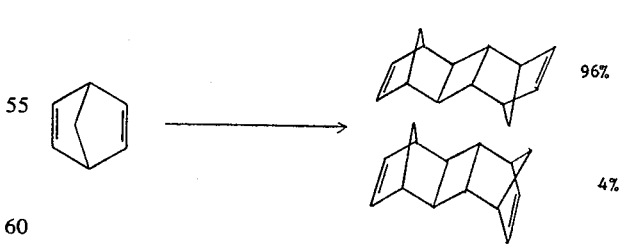

Other unsaturated polycyclic compounds which can be employed in the preparation of the starting materials can be found in the works of: G. N. Schrauzer and S. Eichler, Chem. Ber., 95, 2764 (1962); G. Wittag and J. Otten, Tetrahedron Letters, 601, (1963); C. W. Bird, D. L. Colinese, R C. Cookson, J. Hudec, and R. O. Williams, Tetrahedron Letters, 373, (1961); and C. W. Bird, R. C. Cookson and J. Hudec, Chem Ind. (London), 20 (1960). The saturated dimer of cyclooctatetraene also undergoes isomerization to give the hexacyclotetradecane having four carbon atoms as alkyl substituents.

In practice, isomerization of the aforementioned polycyclic hydrocarbons to give the novel compositions of this embodiment of the invention, can be conveniently effected by heating the hydrocarbon starting material to a temperature within the range of from about 20° to about 250° C. in the presence of an isomerization catalyst.

It is generally suitable to add the catalyst to the polycyclic hydrocarbon which is maintained at a temperature within the aforesaid range. Agitation of the polycyclic hydrocarbon, during the incorporation of the catalyst is desirable to ensure a homogeneous mixture. If desired, temperatures within the range of from about 50° to about 150° C., and more preferably from about 50° to about 120° C. can also be employed. In most cases, it may be desirable to obtain a homogeneous mixture before bringing about any substantial degree of isomerization and in such instances low mixing temperatures can be employed. Catalyst concentrations and temperatures are believed to affect the isomerization rate, the higher concentrations and temperatures promoting faster rates than the lower ones. Catalyst concentrations can be varied over a broad range and can be selected on the basis of the rate of isomerization desired and the temperature to be used. In practice it has been observed that the catalyst should be employed in at least a catalytic amount. By the term "catalytic amount" as employed throughout the specification and appended claims is meant that amount which will promote the isomerization of the polycyclic hydrocarbon to the hexacyclotetradecanes. It has been found that catalyst concentrations from about 0.1 and lower, to about 50 higher, weight percent, based on the weight of the hydrocarbon component, and more preferably from about 1.0 to about 25 weight percent, are advantageous in effecting the reaction.

The time for effecting the isomerization will be governed, to an extent, on several factors such as the particular polycyclic hydrocarbon employed, the particular catalyst component employed, the proportions of the components employed, and other considerations. In general, the time for effecting the complete isomerization can vary from a few hours to several hours, and longer, e.g., from 4 to 15 hours, depending upon the correlation of such factors as illustrated above. The reaction can easily be followed by subjecting periodic samples to gas chromatography until the peaks obtained are consistent with the desired hexacyclotetradecane.

In general, the isomerization catalysts which can be employed comprise the Lewis acids or compounds capable of acting as Lewis acids under the conditions of the invention. Catalysts which have been found to be suitable for use in the process of this invention include among others, the metal halide Lewis acids, e.g., boron trifluoride, aluminum chloride, aluminum chloride-hydrochloric acid, zinc chloride, stannic chloride, ferric chloride, boron trifluoride-piperidine complex, boron trifluoride-1,6-hexanediamine complex, boron trifluoride-mono-ethylamine complex, boron trifluoride-dimethyl ether complex, boron trifluoride-diethyl ether complex, boron trifluoride-dipropyl ether complex, boron trifluoride-hydrogen fluoride, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluene-sulfonic acid, naphthalene-sulfonic acid, lower alkyl substituted-benzenesulfonic acid, and the like.

Other suitable catalysts are the decationized forms of crystalline zeolitic molecular sieves, particularly zeolite Y. Zeolites of the molecular sieve type consist basically of three dimensional frameworks of $SiO_4$ and $AlO_4$ tetrahedra cross-linked by the sharing of oxygen atom and having a balanced electrovalence by virtue of the inclusion within the crystalline structure of cations such as sodium, calcium, potassium and the like. When at least some (preferably 10 percent or more) of these cations are replaced by hydrogen ions, the zeolites behave in a manner similar to Lewis Acid catalysts. Procedures for preparing decationized molecular sieves are set forth in detail in U.S. Pat. No. 3,059,993 (Barrer et al. issued Oct. 23, 1962; and U.S. Pat. No. 3,130,006 (Rabo et al. Apr. 21, 1964). Decationized zeolite Y is preferred catalyst of this type because the high silcon content and particular crystalline structure of zeolite Y permit it to be converted to substantially a 100 percent decationized state without deleterious changes in structure. Zeolite Y is characterized in detail in U.S. Pat. No. 3,130,007 (D.W. Breck Apr. 21, 1964).

Pressure is not necessarily critical, and the reaction can be conducted at atmospheric pressure or superatmospheric pressure. In some instances, however, depending upon the particular catalyst employed, it may be desirable to conduct the reaction at elevated pressures, e.g., within the range of from about 1 to about 75 atmospheres, and more preferably from about 1 to about 40 atmospheres.

Due to the polycyclic ring structure, the compositions of this first embodiment of the invention possess unique physical and chemical properties. Hexacyclotetradecane while containing no functional groups can undergo a wide variety of reactions as hereinafter indicated, to provide useful compositions. For instance, polycyclic compositions can be prepared containing two or more hydroxyl groups. These compositions can be utilized in the preparation of a variety of useful reaction products. For example, glycols have found extensive use in the manufacture of synthetic fibers, alkyl resins, antifreeze and in the pharmaceutical and cosmetic fields. Polyols are also used extensively as freezing point depressants, brake fluids, solvents, plasticizers and the like.

In a second embodiment, the invention is directed to novel derivatives of hexacyclotetradecane which are characterized by the presence of one or more of a variety of functional groups which renders them particularly useful for a wide variety of applications. These novel compositions can be represented by the formula:

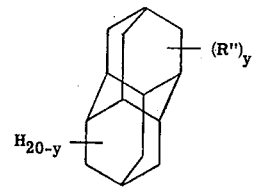

wherein $y$ has the same value as previously indicated and $R''$ represent a substituent selected from the class consisting of: (1) amino, (2) cyano, (3) hydroxyl, (4) halo, (5) hydrazino, (6) isocyanato, (7) nitro, (8) thio, (10) thiocyano, and (11) groups composed of elements of the class consisting of (a) carbon and hydrogen, and (b) carbon, hydrogen and at least one member of the class consisting of oxygen, nitrogen, sulfur and halogen. Preferred compositions are those represented by the aforementioned formula wherein each $R''$ group contains up to 24 carbon atoms, more preferably up to 12 carbon atoms, and not more than four of the remaining elements set forth in (11) (b) above. Particularly preferred polycyclic compositions include those wherein $R''$ represents alkenyl, alkynyl, cycloalkyl, cycloalkenyl, cycloalkynyl, aryl, alkoxy, alkoxyalkyl, aryloxy, aryloxyalkyl, alkoxycarbonyl, aryloxycarbonyl, alkanoyl, alkanoylalkyl, alkanoyloxy, alkanoyloxyalkyl, aroyl, aroylalkyl, aroyloxy, aroyloxyalkyl, carboxyl, carboxyalkyl, carboalkoxyalkyl, formylalkyl, hydroxy, hydroxyalkyl, hydroxyalkoxy, hydroxyalkanoyloxy, halo, haloalkyl, haloformylalkyl, amino, alkylamino, dialkylamino, aminoalkyl, diaminoalkyl, aminoalkoxy, alkylaminoalkoxy, dialkylaminoalkoxy, alkylamido, formamido, carbamyl, carbamylalkyl, glycyl, glycolyl, thio, thioalkyl, thioaryl, thiocarbamyl, thiocarbamylalkyl, nitro, nitroso, nitroalkyl, sulfo, sulfonamido, alkylsulfonyl, sulfoalkyl, cyano, cyanoalkyl, isocyano, isocyanoalkyl, thiocyano, isothiocyano, thiocyanoalkyl, isotyanato, isocyanatoalkyl, hydrazino, hydroximino, hydroximinoalkyl, carbamido, carboxamidoalkyl, epoxyalkyl, epoxycycloalkyl, arylsulfonylureylene, and alkarylsulfonylureylene.

Illustrative novel compositions within this embodiment of the invention include those wherein the aforementioned R" represents a functional group attached directly to a ring carbon atom, preferably at a bridgehead position. Typical polycyclic compositions include, among others, aminohexacyclotetradecane, diaminohexacyclotetradecane, triaminohexacyclotetradecane, cyanohexacyclotetradecane dicyanohexacyclotetradecane, hydroxyhexacyclotetradecane, dihydroxyhexacyclotetradecane, trihydroxyhexacyclotetradecane, fluorohexacyclotetradecane, bromohexacyclotetradecane, chlorohexacyclotetradecane, iodohexacyclotetradecane, dibromohexacyclotetradecane, dichlorohexacyclotetradecane, hydrazinohexacyclotetradecane, isocyanatohexacyclotetradecane, diisocyanatohexacyclotetradecane, triisocyanatohexacyclotetradecane, nitrocyanatohexacyclotetradecane, dinitrocyanatohexacyclotetradecane, sulfocyanatohexacyclotetradecane, thiocyanatohexacyclotetradecane, dithiocyanatohexacyclotetradecane, thiocyanohexacyclotetradecane, and the like.

Further illustrative compositions include those wherein the R" substituent is composed solely of carbon and hydrogen. In addition to the alkyl substituted derivatives, as hereinbefore set forth under the first embodiment, other hexacyclotetradecanes include, the alkenyl derivatives, such as. allylhexacyclotetradecane, but-2-enylhexacyclotetradecane, octadec-9-enylhexacyclotetradecane, and the like; the alkynyl derivatives, such as prop-2-ynylhexacyclotetradecane, non-6-ynylhexacyclotetradecane, and the like; the cycloalkyl derivatives such as, cyclohexylhexacyclotetradecane; the cycloalkenyl derivatives, such as, cyclohex-3-enylhexacyclotetradecane; the aryl derivatives, such as, phenylhexacyclotetradecane, naphthylhexacyclotetradecane, and the like.

Additionally, other polycyclic compositions include those wherein the R" group is composed solely of carbon, hydrogen and oxygen. Illustrative compositions include the ether derivatives of hexacyclotetradecane, such as, ethoxyhexacyclotetradecane, propoxyhexacyclotetaadecane, decoxyhexacyclotetradecane, methoxyethylhexacyclotetradecane, phenoxyhexacyclotetradecane, phenoxyethylhexacyclotetradecane, methoxyphenylhexacyclotetradecane, and the like; the esters, such as, methoxycarbonylhexacyclotetradecane, methanoyloxyhexacyclotetradecane, phenoxycarbonylhexacyclotetradecane, methoxycarbonylethylhexacyclotetradecane, and the like; aldehydes and ketones, such as methanoylhexacyclotetradecane, butanoylhexacyclotetradecane, methanoylpropylhexacyclotetradecane, and the like, the acids, such as carboxyhexacyclotetradecane, dicarboxyhexacyclotetradecane, carboxyethylhexacyclotetradecane, carboxyphenylhexacyclotetradecane, carboxyethoxyhexacyclotetradecane, the alcohols such as hydroxyethylhexacyclotetradecane, dihydroxyethylhexacyclotetradecane, hydroxyethylcarbonyloxyhexacyclotetradecane, and the like.

A further class of novel polycyclic compositions include those wherein the R" group is composed of carbon and hydrogen and at least one other element, of the group consisting of oxygen, nitrogen, sulfur and halogen. Typical compositions within this embodiment of the invention include, among others, those wherein the R" group is composed of carbon, hydrogen and nitrogen. This class includes the amine and cyano derivatives wherein the groups are not attached directly to a ring carbon atom of the hexacyclotetradecane structure. For instance, such compositions include, among others, aminomethylhexacyclotetradecane, diaminoethylhexacyclotetradecane, aminoethoxyhexacyclotetradecane, diaminopropoxyhexacyclotetradecane, methylaminoethylhexacyclotetradecane, dimethylaminoethylhexacyclotetradecane, cyanoethylhexacyclotetradecane, cyanobutylhexacyclotetradecane, cyanophenylhexacyclotetradecane, and the like.

Other illustrative compositions within this class are those wherein R" is composed of carbon, hydrogen, and halogen wherein the halogen atom is not attached directly to a ring carbon atom. Such compositions include, among others, chloromethylhexacyclotetradecane, bromopropylhexacyclotetradecane, chloroformylethylhexacyclotetradecane, chlorophenylhexacyclotetradecane, trichloromethylhexacyclotetradecane, and the like.

Another class of compositions include those wherein the R" group is composed of carbon, hydrogen, oxygen and nitrogen. This class includes the isocyanate, amide, cyanoether and nitro derivatives of hexacyclotetradecane wherein the functional groups are not attached directly to a ring carbon atom. Illustrative compositions include, among others, isocyanatomethylhexacyclotetradecane, isocyanatopropylhexacyclotetradecane, isocyanatoethoxycarbonylhexacyclotetradecane, isocyanatophenylhexacyclotetradecane, diisocyanatophenylmethylhexacyclotetradecane, formamidohexacyclotetradecane, acetamidohexacyclotetradecane, propionamidohexacyclotetradecane, oleamidohexacyclotetradecane, cyanoethoxyhexacyclotetradecane, cyanopropoxyhexacyclotetradecane, nitromethylhexacyclotetradecane, and the like.

A still further class includes those compositions wherein the R" group is composed of carbon, hydrogen, and sulfur. This class includes the thiols, such as thioethylhexacyclotetradecane, thiopropylhexacyclotetradecane, thiophenylhexacyclotetradecane, and the like. Similarly, when oxygen and/or nitrogen are also included in the R" group the class includes such compounds as sulfonamido methylhexacyclotetradecane, N-(p-methylphenyl)sulfonyl-N'-hexacyclotetradecyl urea, isocyanatosulfonylethylhexacyclotetradecane, thiocyanoethylhexacyclotetradecane, and the like. Moreover, all of the aforementioned elements can be present in one compound such as, for example, N-(p-chloro-phenyl)sulfonyl-N'-hexacyclotetradecyl urea, N-(p-methoxyphenyl) sulfonyl-N'-hexacyclotetradecylmethyl urea, N-(p-ethylphenyl) sulfonyl-N'-hexacyclotetradecylmethyl urea, and the like.

It should be noted that the above compositions are only illustrative of the polycyclic compounds of this invention and various other novel compositions are also contemplated and within the scope of the present invention. For example, the novel derivatives can encompass compositions wherein two or more different functional groups are present in the same molecule, for instance, chloro, isocyanatoethylhexacyclotetradecane, and the like.

The aforementioned derivatives of the hexacyclotetradecane can be prepared by one or more synthetic routes. For example, halogenation under ionic conditions at reflux temperatures leads to the mono-, di-, and polyhalo derivatives:

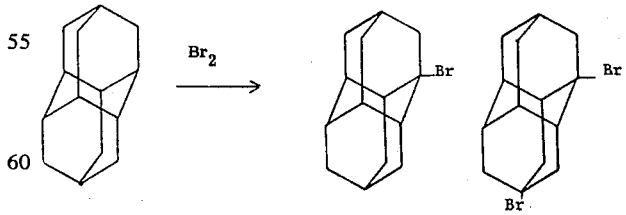

The degree of halogenation may be controlled by the ratio of reactants and by the use of Lewis acid catalysts. It has been observed that under these ionic conditions, substitution at the tertiary carbon atoms is favored.

In general, the novel alkyl substituted compositions can be prepared by other routes than that previously indicated under the first embodiment. For instance, one can start with the nono-holo-hexacyclotetradecane contained in a suitable hydrocarbon solvent, such as for example, cyclohexane, pentane, tetrahydrofuran, and the like, and gradually add this solution at temperatures of from about 25°–50° C., to alkyllithium dissolved in suitable solvent and having the same number of carbon atoms as in the desired ring substituent. After maintaining at the aforesaid temperature for several hours, water is added to the mixture, the organic layer separated, and the alkyl substituted compound recovered and purified by conventional techniques. Alternatively the halogenated compound can be dissolved in solvent, for example cyclohexane, and metallic lithium or sodium added to form the metal-substituted polycyclic compound. Thereafter, an alkyl halide, such as methyl iodide or methyl bromide, is added in solution and the mixture worked up, organic layer isolated, and the product recovered as above.

Treatment of the halo derivative with ammonia leads to the corresponding amino derivative:

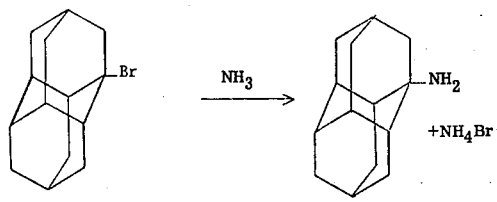

For instance, metallic sodium or potassium is first dissolved in liquid ammonia containing ferric salts, such as ferric acetate, and the halogenated polycyclic compound gradually added. After the reaction is complete ammonia is distilled off, water added, the reaction product taken up in suitable solvent such as benzene, and the amine separated and purified by known procedures. Subsequent phosgenation of the amine provides the corresponding isocyanate. The amino compounds may also be prepared via the Ritter reaction from the present hydrocarbon

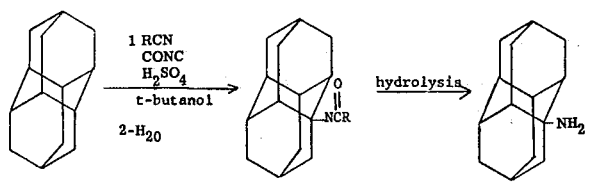

Carboxylic acid derivatives may be prepared by treatment of the hydrocarbon with a mixture of sulfuric acid and formic acid in t-butanol:

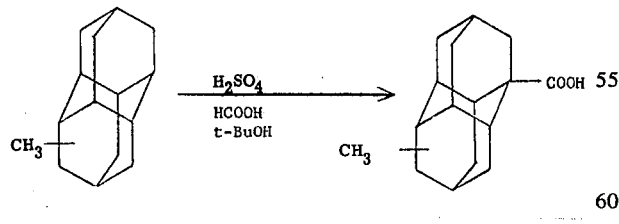

The carboxylic acid derivative is readily converted to the acid chloride with thionyl chloride and the acid chloride can then be converted into a number of derivatives via standard reactions, i.e.,

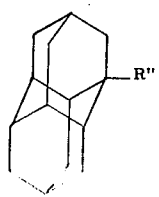

| Reactant | R″ |
|---|---|
| NH₃ | —CONH₂ |
| (CH₃)₂NH | —CON(CH₃)(CH₃) |
| HO—CH₂—CH₂—N(CH₃)(CH₃) | —COOCH₂CH₂—N(CH₃)(CH₃) |
| H₂N—CH₂CH₂—N(CH₃)(CH₃) | —CONHCH₂CH₂—N(CH₃)(CH₃) |

The acids and esters of this embodiment can also be prepared from the compositions having one or more halogens attached directly to the ring. For instance, the halogenated composition is dissolved in a suitable solvent such as cyclohexane, pentane, hexane or the like, and metallic lithium or sodium added as in the previous methods. Thereafter the polycyclic organo-lithium or sodium compound is placed in an autoclave and treated with carbon dioxide at a pressure of at least several atmospheres. Recovery and purification of the acid is then effected by conventional techniques. Esterification with saturated or unsaturated alcohols by conventional methods, affords high yields of the corresponding esters.

The above reactions lead to products which are primarily substituted on the tertiary carbon atoms. Derivatives which have substituents on the secondary carbon atoms may be prepared, for example, by hydroxylation with peracetic acid in the presence of ultraviolet light:

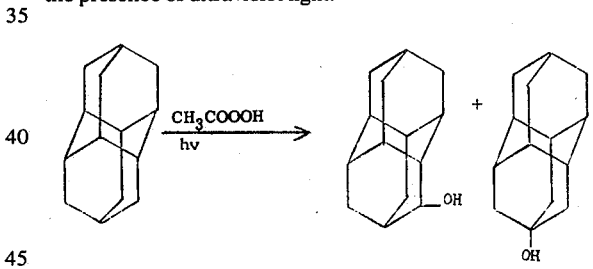

A number of derivatives may then be prepared from the secondary hydroxyl compound. For example, oxidation with chromic acid yields the corresponding ketone from which the amino compound may be prepared by reductive amination with ammonia and hydrogen in the presence of a Raney nickel catalyst. This reaction may also lead to a secondary amine:

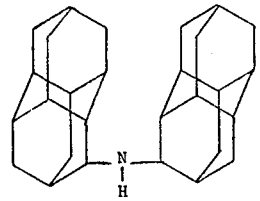

A variety of esters and other compounds may be prepared from each of the aforementioned alcohols by treatment with the corresponding acid chlorides or other reagents.

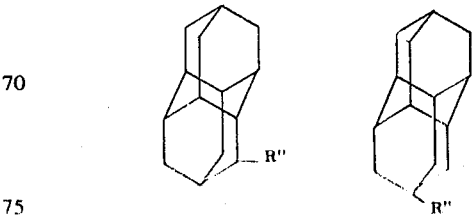

| Reagent | R″ |
|---|---|
| ⬡—COCl | ⬡—COO— |
| CCl₃COCl | CCl₃COO— |
| CH₃NCO | CH₃NHCOO— |
| CH₂=CH—CH₂OH | CH₂=CH—CH₂—O— |
| CH₃CHO | CH₃—CH(O—)(O—) |

The novel hydroxyalkyl substituted compositions can also be conveniently prepared from the halo-substituted compounds that is from those compositions containing the halogen atom(s) attached directly to the ring. Treatment in solvent with sodium or lithium, to replace the halogen(s) with the metal, and then by bubbling through an alkylene oxide, such as ethylene oxide, followed by addition of water, separation and recovery affords good yields of the hydroxyalkyl substituted hexacyclotetradecane. The haloalkyl substituted compositions are thereafter conveniently formed by treating the hydroxyalkyl substituent with thionyl chloride, phosphorus trichloride, and the like according to known techniques. By further reacting the resulting haloalkyl derivative with, for example, sodium or potassium amide in liquid ammonia the aminoalkyl substituted compound is obtained. Conventional phosgenation of the aminoalkyl compounds gives the corresponding isocyanatoalkyl product.

The above reactions indicate the introduction of different functional groups to the hexacyclotetradacane compound. These functional radicals can be further treated by conventional organic synthesis to introduce other substituents on the basic polycyclic structure of this invention. Illustrative reactions which may be employed in the practice of the present invention are characterized by the following wherein the radicals in the equations possessing the free valence are directly bonded to the ring structure of hexacyclotetradecane or bonded through an organic group.

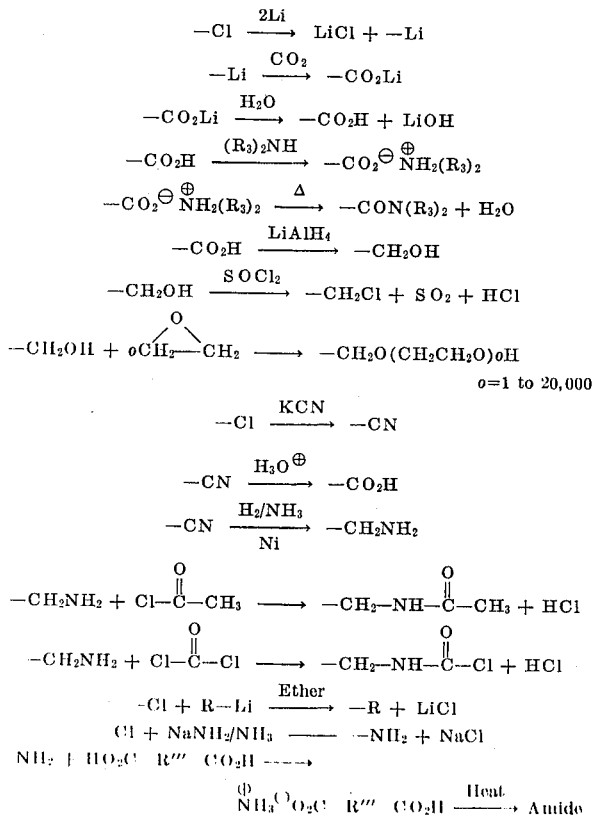

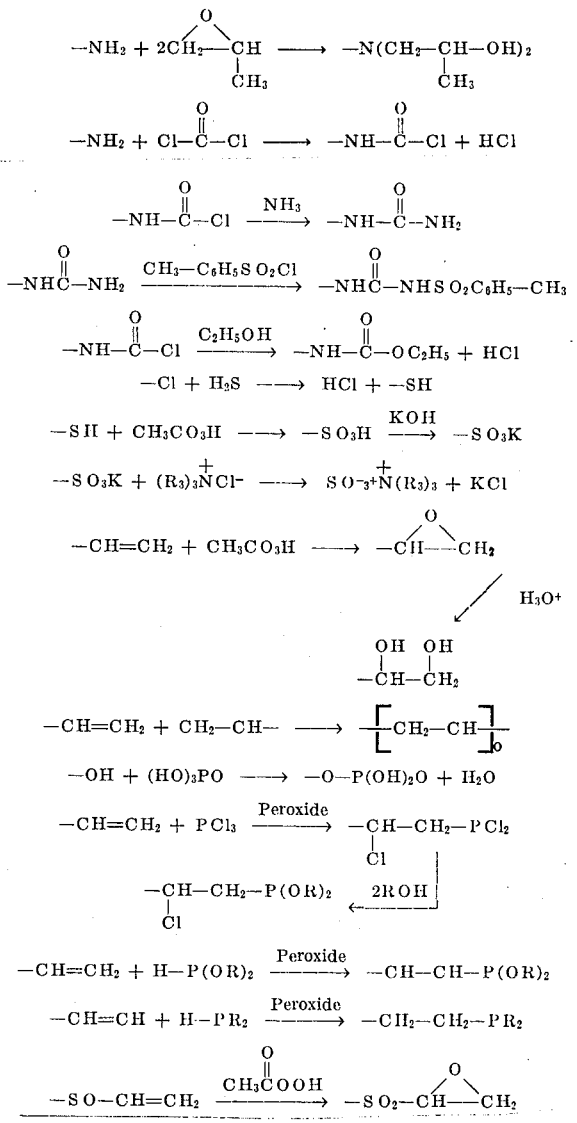

It should be noted that while the aforesaid have been directed, for the most part, to particular substituents, the invention is intended to encompass the disubstituted compositions wherein one substituent is attached directly to the ring and the other attached to the ring through an organic group. For instance, bromo-bromoethylhexacyclotetradecane. Various other combinations will be readily apparent to those skilled in the art in view of the aforesaid discussion.

The novel polycyclic compositions of this invention are useful in a variety of applications as hereinafter indicated. The basic hexacyclotetradecane composition, independent of functional substituents thereon, is a very useful compound. Due to its stability at high temperatures it can be utilized in the field of lubricants. The presence of nonfunctional substituents such as alkyl, aryl, and the like radicals does not alter this utility. In addition these materials may be utilized as fuels. They represent a very compact molecule which gives off a large amount of energy during combustion.

The novel compositions of the second embodiment, due to the presence of functional groups react readily with other compounds such as alcohols, amines, acids to form new and valuable products. Moreover, compositions which contain olefinic bonds in the substituents can be epoxidized to give compounds which are useful as stabilizers for various resin systems. Additionally, many of the unsaturated polycyclic compounds are relatively reactive materials which homopolymerize or copolymerize readily with other reactive cyclic monomers to provide a useful class of polymeric compounds. These polymers can range from viscous liquids to extremely tough solids. The very viscous liquids of relatively low molecular weight, are useful in the preparation of polishes, and waxes, and as thickening agents for various lubricants. The polymers can be employed as protective coatings and impregnants. These polymers are also useful for the production of various shaped articles such as brush handles, buttons, lamp bases, toys and the like. In view of the fact that many of the compositions are polyfunctional, in that each compound contains at least two reactive groups in the molecule, they are particularly useful in those fields of application where polyfunctionality is desired, for example, polyols, polyisocyanates, and the like.

Due to the presence of halogen groups, certain of the novel compositions of this embodiment of the invention have been found useful in a variety of applications. For example, the chlorinated compounds are useful not only as a chemical intermediate in the preparation of numerous compositions, but in electrical insulation applications, hydraulic mediums, lubricants for use at various temperatures, and also as constituents of adhesives, plastics, lacquers, paints and varnishes.

Additionally, the phosphorous substituted compounds, such as the phosphines and phosphates, are usable as lubricants, pour point depressants, as reactants in polymerization reactions (particularly with regard to the phosphate), as plasticizers for vinyl polymers, and the like uses. The amino substituted compounds are useful per se as insecticides and can be utilized as organic hardeners for the conversion of conventional epoxy resins, such as those based on the reaction of epichlorohydrin and Bisphenol A. This is also irrespective of whether the composition is monoamino or polyamino substituted compound. The polyamino, particularly the diamino, substituted compounds can be utilized for the production of polyamide resins of the nylon type by reaction with dicarboxylic acids, anhydrides or acid halides such as adipic acid, succinic acid, sebacic acid, and the like, to produce very useful fiber forming polyamides. The diol containing products may be utilized in the formation of polymers by reaction with, e.g., terephthalic acid, adipic acid, their anhydrides or acid halides, or a mixture of such acids and/or organic diisocyanates, e.g., tolylene diisocyanates. The resulting polyester, polyurethane, and/or polyester polyurethane are extremely useful in the formation of hard abrasion resistant coatings and elastic fibers and films (only in the case of the polyurethanes and polyester polyurethanes) which have a considerable utility in the art.

To illustrate the wide utility of the compounds of this invention, the novel diols, dicarboxy, and diamines described above may be interacted to produce extremely useful elastomic fibers and coatings. For example, the diol may be reacted (e.g. by heating) in slight excess of equimolar amounts with a diacylchloride to produce a polyester having a molecular weight of e.g., above 500, preferably above about 1,000. The hydroxy terminated polyester may then be reacted with, e.g., the diisocyanate, such as tolylene diisocyanate, bis(4-isocyanatophenyl)methane, and the like wherein the diisocyanate is provided in stoichiometric excess. For example, from about 1.33 to 2.5 moles of the diisocyanate per mole of polyester may be interracted. There results an isocyanato endblocked (or terminated) polyesterpolyurethane. The polyesterpolyurethane may be reacted on about an equimolar basis with, e.g., a diamine to form a polyesterpolyureylpolyurethane which can be cast into films and molded into usable articles.

The novel diamines of this invention may also be reacted with either the novel dicarboxylic acids of this invention or with aromatic or acyclic dicarboxylic acids to produce fiber and film forming polyamides. By the same token, the novel hexacyclotetradecane dicarboxylic acids or acid halides can be reacted with aromatic or acyclic diamines to produce fiber and film forming polyamides. Diamines and dicarboxylic acids, other than the aforedefined hexacyclotetradecane diamines and dicarboxylic acids, which may be employed as just mentioned above include, e.g., ethylene diamine, tetramethylene diamine, pentametnylene diamine, hexamethylene diamine, decamethylenediamine, piperazine, 2,5-dimethylpiperazine, 1,4-phenylene diamine, etc., oxalic acid, malonic acid, maleic acid, fumaric acid, succinic acid, adipic acid, sebacic acid, suberic acid, dimerized linoleic acid, dimerized oleic acid, and the like. The polyamide may be formed by conventional melt polymerization in bulk, solution or suspension. The polyamides may also be formed at lower temperatures by first forming the diammonium salt, partially polymerize in the presence of water and then finish off the polymerization at temperatures above 100° C. but below the melting point of the polymer, i.e., effect solid state polymerization. The polyamides may be also produced by the well known interfacial polymerization technique network the resulting polymer may be conveniently vulcanized by the conventional methods used for curing rubber. The presence of the double bond permits the vulcanization, for example, by sulfur, peroxides and the like, thus, for example, a polymeric polyurethane can be prepared by reacting a polymeric glycol with an organic diisocyanate and the unsaturated polyol to obtain a polymer which can be cured with conventional curing agents. In general, with this method, the unsaturated polyol is used to the extent of about 1 to 10 percent by weight in the final polyurethane elastomer formulation and is vulcanized with about 0.5 to 10 parts by weight of sulfur or other curing agent per 100 parts of polymer. Curing at temperatures of about 125°–160° C. for from one-half to several hours is generally sufficient. Depending on the particular polyurethan used, various modifications of the curing step may be employed.

As previously indicated, the novel compositions which are obtained by the practice of this invention are a useful class of compounds having significant and unobvious properties in various fields of application. Due to the unsaturated nature, certain of the novel compositions, such as allylhexacyclotetradecane, are particularly attractive for use as reactive polymerizable monomers. For example, the unsaturated compounds of this invention can be homopolymerized through the olefinic group, or copolymerized with other olefinically unsaturated organic compounds, e.g., vinyl monomers through their olefinic groups, preferably in the presence of a peroxide catalyst to give linear solid polymeric products which have utility in the molding, laminating, and coating arts, e.g., manufacture of plastic toys which can be rigid or flexible, paperweights, inkstands, and the like.

Additionally, many of the unsaturated compositions of this invention can be contacted with an organic peracid to produce the corresponding vicinal-epoxides. Among the peracids contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, perdodecanoic acid, perbenzoic acid monoperphthalic acid, and the like. The lower aliphatic hydrocarbon peracids which contain from two to four carbon atoms are highly suitable. Peracetic acid is most preferred. It is highly desirable to employ the peracid as a solution in an inert normally liquid organic vehicle such as ethyl acetate, butyl acetate, acetone, and the like. A solution comprising from about 10 to 50 eight percent of peracid, based on the total weight of peracid and inert organic vehicle is suitable; from about 20 to 40 weight percent of the peracid is preferred. The epoxidation reaction can be conducted at a temperature in the range of from about 0° C., and lower, to about 100° C., and higher, and preferably from about 20° C. to about 80° C. Substantial conversion of the monoethylenically unsaturated cyclic carbonate compound to the corresponding vicinal-epoxy cyclic carbonate compound is accomplished by employing at least 1 mol of peracid per mol of said monoethylenically unsaturated cyclic carbonate, e.g., from about 1.0 to about 10 mols of peracid per mol of said carbonate. In general, the epoxidation reaction is conducted for a period of time which is sufficient to introduce oxirane oxygen at the site in the carbonate reactant. Oftentimes, this reaction period is usually sufficient to essentially consume the quantity of peracid employed. Periodic analysis of samples of the reaction mixture to determine the quantity of peracid consumed during the epoxidation reaction can be readily performed by the operator by well known techniques. At the termination of the epoxidation reaction, the unreacted ethylenically unsaturated carbonate precursor, acid by-product, inert vehicle, if employed, and the like, can be recovered from the reaction product mixture, for example, by distillation under reduced pressure. Further well known procedures such as fractional distillation, and the like, can be used to purify the vicinal-epoxy cyclic carbonate product.

The novel and useful vicinal-epoxy polycyclic compounds can be homopolymerized or copolymerized with other vicinal-epoxy cyclic carbonates or with other mono- or polyepoxides, preferably in the presence of an epoxy polymerization catalyst such as the metal halide Lewis acids, e.g., boron trifluoride, under typical epoxy polymerization conditions, to give solid polymeric products which are useful as paperweights, in the manufacture of toys, etc.

In addition, the novel vicinal-epoxy polycyclic compounds with or without a polyepoxide such as those illustrated previously, can be reacted with an active organic hardener such as polycarboxylic acids, polycarboxylic acid anhydrides, polyfunctional amines, polyols, polythiols, polyisocyanates, polyacyl halides, and the like, preferably in the presence of a typical epoxy polymerization catalyst, $BF_3$-etherate, under conventional curing conditions, to produce solid epoxy resins which are useful in the laminating, coating, molding, and encapsulating arts.

In view of the fact that the novel compounds of this invention can be characterized by the presence of at least two hydroxyl groups, these compositions can be utilized in the preparation of a variety of useful reaction products. For example, glycols have found extensive use in the manufacture of synthetic fibers, alkyl resins, antifreeze and in the pharmaceutical and cosmetic fields. Polyols are also used extensively as freezing point depressants, brake fluids, solvents, plasticizers and the like.

Due to the similarity in physical and chemical properties of the hexacyclotetradecanes of the tricyclo[$3.3.1.1^{3,7}$] decanes, as hereinbefore indicated, certain of the novel compositions of this invention are also of interest in the preparation of physiologically active compounds. For instance the N-aryl-sulfonyl-N'-hexacyclotetradecyl ureas are of interest as hypoglycemic agents. Moreover, the hydroyethylcarbonyloxyhexacyclotetradecane and the carboxyethoxyhexacyclotetradecane exhibit choleretic activity.

The following examples are illustrative:

EXAMPLE I

Preparation of Dodecahydro-1,4:5,8-Dimethanobiphenylene

The apparatus herein comprises a quartz immersion well, fitted with a heat-resistant glass filter (obtainable from Hanovia Chemical and Manufacturing Company, Newark, N.J.), which well is immersed in a 200 milliliter heat-resistant glass reactor containing a nitrogen gas bubbler at the bottom. The reactor is temperature controlled by a water bath, which in this example is maintained at about 8° C. The water from the bath, at the same temperature, is also circulated through the quartz immersion well. The light source is a Hanovia 450 watt high pressure mercury arc.

A solution of 9.4 grams of norbornene and 1.2 grams of acetophenone in 190 milliliters of benzene is irradiated in the above apparatus for 48 hours. Nitrogen is slowly bubbled through the solution during irradiation. The benzene is then removed under reduced pressure on a rotary evaporator and the residue is chromatographed on 100 grams of alumina eluting with n-hexane. The desired dimer comes off the column in the first fractions and usually crystallizes upon removal of solvent. The yield is 6.5 grams (70 percent theoretical yield) of 1,4:5,8-dimethanobiphenylene having a melting point of 36°–40 C. After recrystallization from acetone using dry ice to induce crystallization colorless plates are obtained having a melting point of 41.5°–42° C. Upon analysis the product was found to have the following compositions: Calculated for $C_{14}H_{20}$: C, 89.29; H, 10.71. Found: C, 89.31, H, 10.44.

EXAMPLE II

Preparation of Hexacyclotetradecane

In a 500 ml. Erlenmeyer flask having a 24/40 standard taper joint are placed 200 g. (1.06 moles) of molten dodecahydro-1,4:5,8-dimethanobiphenylene and a magnetic stirring bar. A well greased inner joint (2.2 × 15 cm., 24/40) is fitted into the top of the flask to serve as an air condenser, and 40 g. of anhydrous aluminum chloride is added through the opening. The reaction mixture is simultaneously stirred and heated at 150°–200° C. by means of a combination magnetic stirrer-hot plate. After the mixture has been heated for 8–15 hours, the flask is removed from the hot plate-stirrer and the contents upon cooling separate into two layers. The upper layer, is decanted into a 600 ml. beaker. The Erlenmeyer flask is rinsed five times with a total of 250 ml. of petroleum ether (b.p. 30°–60) with decantation into the same beaker. The petroleum ether suspension is warmed until all the product is in solution, and the solution decolorized by careful addition of 10 g. of chromatography-grade alumina. The hot solution is filtered, and the alumina and the beaker washed thoroughly with solvent. The filtrate is concentrated to a volume of about 200 ml. by distillation and then cooled in a Dry-Ice-acetone bath. The solid product is removed by suction filtration and upon recrystallization, there is obtained hexacyclotetradecane of the formula:

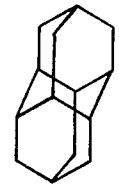

and having a melting point of 236°–237° C. Nuclear magnetic resinance (NMF) analysis indicates that the spectra consisted of a singlet centered around tau 8.32. Infrared analysis indicates a simple structure shile the mass spectrum of the compound is found to be consistent with its symmetrical, fuse structure, in which all the bridgeheads are separated only by methylene groups.

WHAT IS CLAIMED IS:

1. A process for the preparation of a polycyclic compound of the formula:

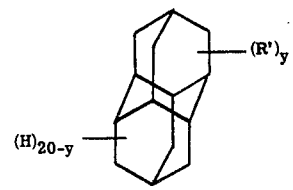

wherein R' represents a member selected from the group consisting of hydrogen and alkyl groups, and y has a value of from 1 to 8, with the proviso that the sum total of carbon atoms in the R' groups is no greater than 10, which process comprises isomerizing (1) a polycyclic saturated hydrocarbon containing at least 14 carbon atoms and five fused ring systems of from three to eight carbon atoms per ring, with (2) a Lewis acid catalyst at a temperature of from about 25° C. to about 250° C., and thereafter recovering said polycyclic composition.

2. The process of claim 1 wherein said Lewis acid is aluminum chloride.

3. A process for the preparation of a polycyclic compound of the formula:

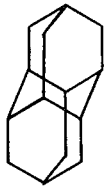

which comprises isomerizing (1) a polycyclic hydrocarbon containing 14 carbon atoms and five fused ring systems of from three to eight carbon atoms per ring, with (2) a Lewis acid catalyst at a temperature of from about 25° C. to about 250° C., and thereafter recovering said polycyclic composition.

4. The process of claim 3 wherein said Lewis acid is aluminum chloride.

5. A process for the preparation of polycyclic compound of the formula:

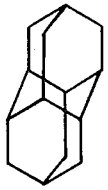

which comprises isomerizing dodecahydro-1,4:5,8-dimethane-biphenylene with a Lewis acid catalyst at a temperature of from about 25° to about 250° C., and thereafter recovering said polycyclic composition.

6. A polycyclic compound of the formula:

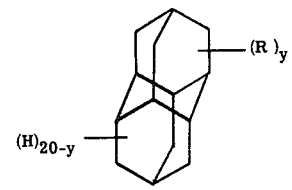

wherein R represents a member selected from the group consisting of hydrogen, and hydrocarbons containing up to 24 carbon atoms and $y$ has a value of from 1 to 8.

7. A polycyclic compound of the formula:

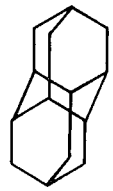

* * * * *